3,712,868
FOAM CONTROL PROCESS
Frederick C. Saunders, Cowbridge, Wales; Kelvin J. Bryon, Upper Basildon, England; and Brian J. Griffiths, Pontycymmer, Wales (all c/o Midland Silicones Limited, Reading, England)
No Drawing. Filed May 25, 1970, Ser. No. 40,440
Int. Cl. B01d 17/00
U.S. Cl. 252—321     7 Claims

ABSTRACT OF THE DISCLOSURE

Foaming in aqueous media, for example fermentation broths, is suppressed or reduced by contacting the aqueous medium with an organosilicon polymer having at least two organosiloxane units in which at least one of the organic substituents is a polyoxyethylene group of the general formula $$RO[CH_2CH_2O]_y-$$

wherein R represents a monovalent hydrocarbon radical, a triorganosilyl radical or an acyl radical and y has a value of 2, 3 or 4.

---

This invention relates to a process for the suppression or reduction of foaming in an aqueous medium.

Foam controlling compositions based on organopolysiloxanes are now well known in the art and have found widespread application in many fields, for example in vat dyeing and in the preparation of pharmaceuticals by fermentation processes, where their defoaming and antifoaming properties have proved highly beneficial. The previously known commercially available foam controlling compositions have, as far as is known, been confined almost exclusively to those products comprising a dimethylpolysiloxane either alone or in admixture with a finely-divided silica. In order to achieve satisfactory dispersion in the aqueous medium these compositions have been employed usually in the form of a solution in an organic solvent or as an aqueous emulsion.

Silicone foam controlling compositions have found widespread application in the preparation of drugs by fermentation processes where the formation of a copious foam in the fermentation broth often occurs, particularly during the aeration of the broth which is normally a feature of these processes. In such processes it is desirable to minimise or avoid completely the addition to the broth of any ingredients such as solvents and emulsifying agents which could interfere with the fermentation process or which may be unacceptable from a toxicological standpoint. For this reason it is usual to employ the silicone antifoam material in the absence of dispersing aids such as solvents and emulsifying agents even though difficulty is then experienced in effectively dispersing the silicone material.

We have now found that certain of the class of materials known generally as silicone-glycol copolymers are highly effective in controlling foaming in aqueous media and are particularly useful for reducing or suppressing the foaming which occurs in fermentation broths. With regard to this latter application we have found that the said silicone-glycol copolymers are effective in quantities less than those normally required when the conventional silicone foam controlling products are employed. Moreover, such copolymers are effective in the absence of dispersing aids such as solvents and/or emulsifying agents.

Accordingly this invention provides a process for suppressing or reducing foam in an aqueous medium which comprises contacting said aqueous medium with an organo silicon polymer having at least two organosiloxane units and wherein at least one of the silicon-bonded organic substituents present in the said organosiloxane units comprises a polyoxyethylene group of the general formula $$RO[CH_2CH_2O]_y-$$

wherein R represents a monovalent hydrocarbon radical free of aliphatic unsaturation, a triorganosilyl radical or an acyl radical and y has a value of 2, 3 or 4.

The organosilicon polymers employed in the process of this invention are characterised by the presence therein of at least two organosiloxane units and at least one specified oxyethylene radical bonded to a silicon atom of a siloxane unit. It has previously been proposed to employ certain general types of polysiloxane-polyoxyalkylene block copolymers as antifoaming agents. However, we have found that the particular organosilicon polymers employed according to this invention have unexpectedly superior foam controlling properties when compared with previously known materials containing organosiloxane units. In this connection the number and nature of the oxyalkylene units in the polyoxyalkylene group has been found to be narrowly critical inasmuch as, for the purpose of this invention, the oxyalkylene units should be of the formula $-CH_2CH_2O-$, that is they should be oxyethylene units, and y in the general formula $$RO[CH_2CH_2O]_y-$$

should have a value of 2, 3 or 4. The radical R may be a hydrocarbon radical free of aliphatic unsaturation, for example an alkyl radical such as the methyl, ethyl, propyl, butyl, nonyl or dodecyl radicals, or an aryl radical such as the phenyl, tolyl or naphthyl radicals. In addition the R radical may comprise an acyl radical such as the acetyl or propionyl radicals or a triorgansilyl radical for example the trimethylsilyl radical, dimethylphenylsilyl radical or the dimethyvinylsilyl radical.

Several methods are known for preparing the organosilicon polymers employed according to the process of this invention. For example, they may conveniently be prepared by reacting the appropriate monoether of a di-, tri- or tetra-ethylene glycol, e.g. the ethyl or butyl ether of triethylene glycol, with an organopolysiloxane containing silicon-bonded hydrogen atoms in the presence of a catalyst such as chloroplatinic acid or stannous octoate. Such a reaction is now well-known and one method for promoting the reaction between silicon-bonded hydrogen atoms and organic hydroxyl radicals is described for example in British specification No. 842,674. Another method for preparing the organosilicon polymers comprises reacting a monoether of a di-, tri- or tetra-ethylene glycol with an organosiloxane polymer containing silicon-bonded alkoxy radicals in the presence of a catalyst such as p-toluenesulphonic acid or trifluoroacetic acid.

In addition to the silicon-bonded organic radicals and the silicon-bonded polyoxyethylene groups the organosilicon polymers employed in the process of this invention may contain small proportions of silicon-bonded hydrogen atoms. The presence of such silicon-hydrogen groups may arise, for example, through termination of the preparative process before the reaction is complete, or by employing less than the stoichiometric quantity of the polyoxyethylene reactant.

The preferred organosilicon polymers for use in the process of this invention are those containing at least ten siloxane units and having an average from 1.95 to 2.2 total substituents per silicon atom. Most preferably the organosilicon polymer comprises units of the general formula $$RO[CH_2CH_2O]_ySiO\underset{|}{\overset{R'}{}}$$

in which R' represents an alkyl radical, preferably the methyl radical, and R and y are as hereinbefore defined.

The preferred organosilicon polymers may be homopolymers of the above specified units or may be copolymers of these units with diorganosiloxane units and/or triorganosiloxane units. When present, the copolymeric diorganosiloxane units are preferably predominantly dihydrocarbonsiloxane units such as dimethylsiloxane units. The copolymeric triorganosiloxane units may be for example, trimethylsiloxane units or may contain one or more of the specified oxyethylene substituent groups. The proportion of the defined polyoxyethylene groups present in the organosilicon copolymer preferably falls within the range from 30 to 90 percent and most preferably 60 to 85 percent, based on the total weight of the polymer. In general we have found that copolymers containing a proportion of polyoxyethylene groups at the lower end of range of 30–90 percent may be used in aqueous media which are subjected to vigorous agitation. In systems where there is little or no agitation of the aqueous medium the use of organosilicon polymers containing higher proportions of the oxyethylene groups, is preferred.

The process of this invention finds application in controlling undesired foaming in aqueous media in a wide variety of industrial processes, for example, in the manufacture of synthetic latices, sugar beet processing and in the preparation and application of surface coating material. With regard to the preparation of surface coatings, such as emulsion paints, the use as defoaming agents of the organosilicon polymers specified herein for the most part overcomes the disadvantages, for example the occurrence of cissing, which has been known to take place during surface coating following the use of the more conventional silicone defoamers.

The process of this invention has been found to be particularly effective in reducing foaming in fermentation broths employed in the production of pharmaceutical products, for example antibiotics such as penicillin, tetracycline and oxytetracyline. For such an application those organosilicon polymers containing 2 or 4 ethyleneoxy groups in the polyoxyalkylene substituent have been found to give acceptable results but superior results are generally obtained when the polyoxyethylene substituents in the organosilicon polymer are those containing three ethyleneoxy units and when the organosilicon polymer contains on average about one polyoxyethylene substituent per silicon atom.

Preferably the aqueous medium is contacted with the organosilicon polymer by dispersing the said polymer in the aqueous medium. Other methods for bringing about contact may however be employed. For example, the organosilicon polymer may be disposed on a supporting substrate which is positioned just above the highest desired foam level. With the latter arrangement the organosilicon polymer may be leached from the support and carried into the aqueous medium during foam rise and subsidence. In general from about 20 to 200 parts by weight of the organosilicon polymer per million parts of aqueous medium is usually sufficient to achieve the desired effect. Greater or lesser proportions may however be employed. If desired the organosilicon polymer may be compounded with a filler, preferably a fine particle size fume silica or precipitated silica, or dispersing agents such as solvents and emulsifying agents before use. Such additional materials should preferably be employed however, only when their presence is not detrimental to the foaming medium or is acceptable from toxicological considerations.

The following examples illustrate the invention.

EXAMPLE 1

An organopolysiloxane was prepared by the equilibration of tetramethyldisiloxane (13.4 parts by weight) and tetramethylcyclotetrasiloxane (CH$_3$HSiO)$_4$ (240 parts by weight). After removal of low molecular weight species by distillation following equilibration an organopolysiloxane was obtained having the average formula

Sixty parts by weight of this siloxane was then reacted in the presence of chloroplatinic acid as catalyst with 340 parts by weight of the monoethyl ether of triethylene glycol [C$_2$H$_5$O(CH$_2$CH$_2$O)$_3$H]. The reaction was allowed to proceed for 3 hours and at the end of this period the reaction mixture was vacuum distilled at 0.5 mm. Hg and 150° C. in order to remove unreacted components. The product remaining was a copolymer of the average formula

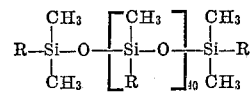

wherein R=CH$_3$CH$_2$O[CH$_2$CH$_2$O]$_3$—.

When this copolymer was dispersed in a fermentation broth of the type employed in the production of tetracycline it was found to be highly effective in controlling the copious foaming which occurred in the broth in a proportion as low as 15 parts per million by weight based on the weight of the broth.

EXAMPLE 2

Tetramethyldisiloxane (13.4 parts by weight), octamethylcyclotetrasiloxane (29.6 parts by weight) and tetramethylcyclotetrasiloxane (CH$_3$HSiO)$_4$ (216 parts by weight) were equilibrated in the presence of an acid catalyst to provide, after distillation to remove unreacted and low molecular weight materials, a siloxane copolymer of the average formula

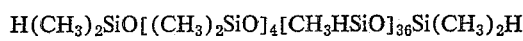

71.2 parts by weight of this siloxane polymer were then mixed with 195.8 parts by weight of the monoethyl ether of triethylene glycol and 0.5 ml. of a 10% w./w. solution of chloroplatinic acid hexahydrate in absolute isopropanol and the reaction mixture heated to 100° C. After 3 hrs. at this temperature the reaction mixture was distilled at 140° C. and 0.2 mm. Hg to remove unreacted materials and a product was obtained having the average formula

where R=CH$_3$CH$_2$O[CH$_2$CH$_2$O]$_3$—.

This product was effective in proportions as low as 20 parts per million by weight in controlling foaming in a fermentation broth of the type employed in the production of oxytetracycline.

EXAMPLE 3

Employing the general method set out in Example 1, two trimethylsiloxy end-stopped methylhydrogensiloxane copolymers were prepared. One copolymer contained on average 10 methylhydrogensiloxane units and 24 dimethylsiloxane units whilst the other copolymer contained an average of 20 methylhydrogensiloxane units and 15 dimethylpolysiloxane units. Both copolymers were then reacted with a stoichiometric excess monoethyl ether of triethylene glycol in the manner described in Example 1 to provide organosilicon polymers containing 10 to 20 silicon-bonded CH$_3$CH$_2$O[CH$_2$CH$_2$O]$_3$— groups respectively.

When added in quantities of 25 and 75 parts per million respectively to a vigorously agitated solution of 0.1% by weight of Tween 80 in water the copolymers effectively controlled the formation of foam therein,

EXAMPLE 4

A copolymer of the average formula $$(CH_3)_3SiO[CH_3(R)SiO]_{40}Si(CH_3)_3$$

in which $R=CH_3CH_2O(CH_2CH_2O)_3—$ was prepared by reacting a trimethylsiloxy-terminated methylhydrogenpolysiloxane with the monoethyl ether of triethylene glycol in the presence of chloroplatinic acid as catalyst.

The antifoaming efficiency of the copolymer was determined by adding with a micro pipette increments of the copolymer to 200 ml. of a vigorously aerated corn steep liquor composition contained in a 500 ml. glass measuring cylinder. The corn steep liquor composition consisted of an aqueous dispersion of the following ingredients.

|  | G./l. |
|---|---|
| Lactose | 35 |
| Glucose | 10 |
| Corn steep liquor | 35 |
| $KH_2PO_4$ | 4 |
| $CaCO_3$ | 10 |
| Ground nut oil | 2.5 |

The test was carried out both with the composition at 22° C. and with it at 50° C. Incremental addition of the polymer to the foaming liquor was continued until foaming was suppressed for at least 5 minutes and the total polymer addition (as parts per million) recorded. It was found that foaming was suppressed for 5 minutes with the addition of as little as 25 parts per million of the organosilicon polymer at 22° C., and 100 p.p.m. at 50° C.

For the purpose of comparison the test was repeated to determine the antifoaming efficiency of a dimethylsiloxane polymer in which some of the silicon-bonded methyl radicals were replaced with radicals of the formula $(CH_2)_3(OC_2H_4)_{11}OH$, the content of such radicals being 70% by weight of the polymer. Using this copolymer foaming was not inhibited at either temperature even at a level of addition of 6000 p.p.m.

We claim:

1. A process for suppressing or reducing foaming in an aqueous medium which comprises contacting the aqueous medium with an organosilicon polymer having at least ten organosiloxane units and an average of from 1.95 to 2.2 total organic substitutents per silicon atom, at least one of said organosiloxane units having the general formula $$RO(CH_2CH_2O)_y\underset{\underset{R'}{|}}{Si}O$$

in which R' represents an alkyl radical, y is 2, 3 or 4, R represents a radical selected from monovalent hydrocarbon radicals, triorganosilyl radicals and acyl radicals, any other siloxane units present in the polymer being dihydrocarbonsiloxane units, trihydrocarbonsiloxane units or both, and the $RO(CH_2CH_2O)_y$ groups comprise from 30 to 90 percent of the total weight of the polymer.

2. A process as claimed in claim 1 wherein y has a value of 3.

3. A process as claimed in claim 2 wherein the polyoxyethylene groups comprise from 60 to 85 percent of the weight of the copolymer.

4. A process as claimed in claim 1 wherein R' represents the methyl radical.

5. A process as claimed in claim 4 wherein the organosilicon polymer also comprises copolymerized organosiloxane units selected from dihydrocarbon siloxane and/or triorganosiloxane units.

6. A process as claimed in claim 1 wherein the organosilicon polymer has dispersed therein a fine particle size fume or precipitated silica.

7. A process as claimed in claim 1 wherein the aqueous medium is a fermentation broth for the production of pharmaceutical products.

References Cited

UNITED STATES PATENTS

| 3,250,727 | 5/1966 | Noll et al. | 252—358 |
| 3,304,266 | 2/1967 | Sullivan | 252—358 |
| 3,280,160 | 10/1966 | Bailey | 252—358 |
| 3,384,600 | 5/1968 | Domba | 252—321 |

OTHER REFERENCES

Kanner et al., I&EC Prod. Res. & Development, vol. 6, #2, June 1967, pp. 88–92.

Boudreau, Modern Plastics, vol. 44, #5, January 1967, pp. 133–35, 138, 143–4, 147, 234, 239–40.

JOHN D. WELSH, Primary Examiner

U.S. Cl. X.R.

252—358